US012574626B2

(12) United States Patent
Kamm et al.

(10) Patent No.: US 12,574,626 B2
(45) Date of Patent: Mar. 10, 2026

(54) TRACKING CAMERA AND OPERATION THEREOF

(71) Applicant: Sony Group Corporation, Tokyo (JP)

(72) Inventors: Markus Kamm, Stuttgart (DE); Dario Brescianini, Stuttgart (DE); Peter Dürr, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 24 days.

(21) Appl. No.: 18/283,001

(22) PCT Filed: Feb. 24, 2022

(86) PCT No.: PCT/EP2022/054679
§ 371 (c)(1),
(2) Date: Sep. 20, 2023

(87) PCT Pub. No.: WO2022/207196
PCT Pub. Date: Oct. 6, 2022

(65) Prior Publication Data
US 2024/0244310 A1      Jul. 18, 2024

(30) Foreign Application Priority Data
Mar. 30, 2021    (EP) ..................................... 21165973

(51) Int. Cl.
*H04N 23/58*        (2023.01)
*G01S 17/10*        (2020.01)
*G01S 17/86*        (2020.01)

(52) U.S. Cl.
CPC ............. *H04N 23/58* (2023.01); *G01S 17/10* (2013.01); *G01S 17/86* (2020.01)

(58) Field of Classification Search
CPC ........ H04N 23/58; H04N 23/69; G01S 17/10; G01S 17/86; G06T 2207/10028; G06T 2207/30224; G06T 7/20
See application file for complete search history.

(56) References Cited

U.S. PATENT DOCUMENTS

| | | | |
|---|---|---|---|
| 6,145,784 A | 11/2000 | Livingston | |
| 8,400,619 B1 * | 3/2013 | Bachrach ................. | G01C 1/04 |
| | | | 356/4.1 |
| 10,345,447 B1 * | 7/2019 | Hicks ...................... | G01S 17/86 |
| 10,820,795 B1 | 11/2020 | Weise et al. | |
| 2014/0009650 A1 | 1/2014 | Kim et al. | |
| 2019/0277968 A1 | 9/2019 | Lu et al. | |

(Continued)

FOREIGN PATENT DOCUMENTS

| | | |
|---|---|---|
| CN | 105242392 A | 1/2016 |
| CN | 108490446 A | 9/2018 |

(Continued)

OTHER PUBLICATIONS

International Search Report and Written Opinion mailed on Jun. 9, 2022, received for PCT Application PCT/EP2022/054679, filed on Feb. 24, 2022, 9 pages.

*Primary Examiner* — Maria E Vazquez Colon
(74) *Attorney, Agent, or Firm* — XSENSUS LLP

(57) ABSTRACT

A tracking camera is disclosed, including a mirror assembly and sensors communicatively coupled to a controller. The controller receives data from the sensors and adjusts the mirror assembly based on the data. The sensors include a time-of-flight sensor for determining distance.

18 Claims, 4 Drawing Sheets

(56)                    References Cited

U.S. PATENT DOCUMENTS

| | | | | |
|---|---|---|---|---|
| 2020/0013181 A1* | 1/2020 | Uyeno | .................... | G01S 17/86 |
| 2020/0079412 A1* | 3/2020 | Ramanathan | ........ | G06Q 20/202 |
| 2021/0014435 A1 | 1/2021 | Seo et al. | | |

FOREIGN PATENT DOCUMENTS

| | | | |
|---|---|---|---|
| JP | 2004040514 A | 2/2004 |
| JP | 2013120115 A | 6/2013 |

* cited by examiner

TRACKING CAMERA AND OPERATION THEREOF

CROSS-REFERENCE TO RELATED APPLICATIONS

The present application is based on PCT filing PCT/EP2022/054679, filed Feb. 24, 2022, which claims priority from European Patent Application No. 21165973.5, filed Mar. 30, 2021, the entire contents of each are incorporated herein by reference.

FIELD

The present disclosure relates to optical imaging devices, particularly cameras and camera assemblies for tracking objects. Examples relate to a method and an apparatus for tracking objects.

BACKGROUND

A tracking camera may track the movement of an object in space. A ball tracking system, such as a ball tracking camera may be used in sports such as tennis and golf, for example. Tracking moving objects with a vision sensor such as a camera presents many technical challenges, such as with respect to having adequate responsivity of the tracking system/method and optical resolution. It may be desirable to design tracking devices and methods to enable tracking of rapidly moving/accelerating objects, particularly small and/or low optical contrast objects, as well as to improve optical images obtained with tracking cameras.

SUMMARY

In view of the technical challenges in designing tracking devices and methods that can track rapidly moving or accelerating objects, herein is disclosed a tracking camera as defined in appended independent claim 1. Further advantages are provided by the subject matter defined in the dependent claims.

A tracking camera is disclosed herein, including a mirror assembly, a camera sensor, and a time-of-flight (TOF) sensor. Each sensor can be communicatively coupled to a controller. The controller receives data from the camera sensor and TOF sensor, and adjusts the mirror assembly based on the data.

A method of operating a tracking camera is disclosed herein, including receiving data from a TOF sensor and a camera sensor, determining an adjustment signal based on the data, transmitting the adjustment signal to a mirror assembly, and adjusting the mirror assembly according to the adjustment signal. A non-transitory computer-readable medium computer program is disclosed, having a program code for, when executed on a processor, causing the execution of the method.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. The figures are not necessarily to scale.

Figure 1:
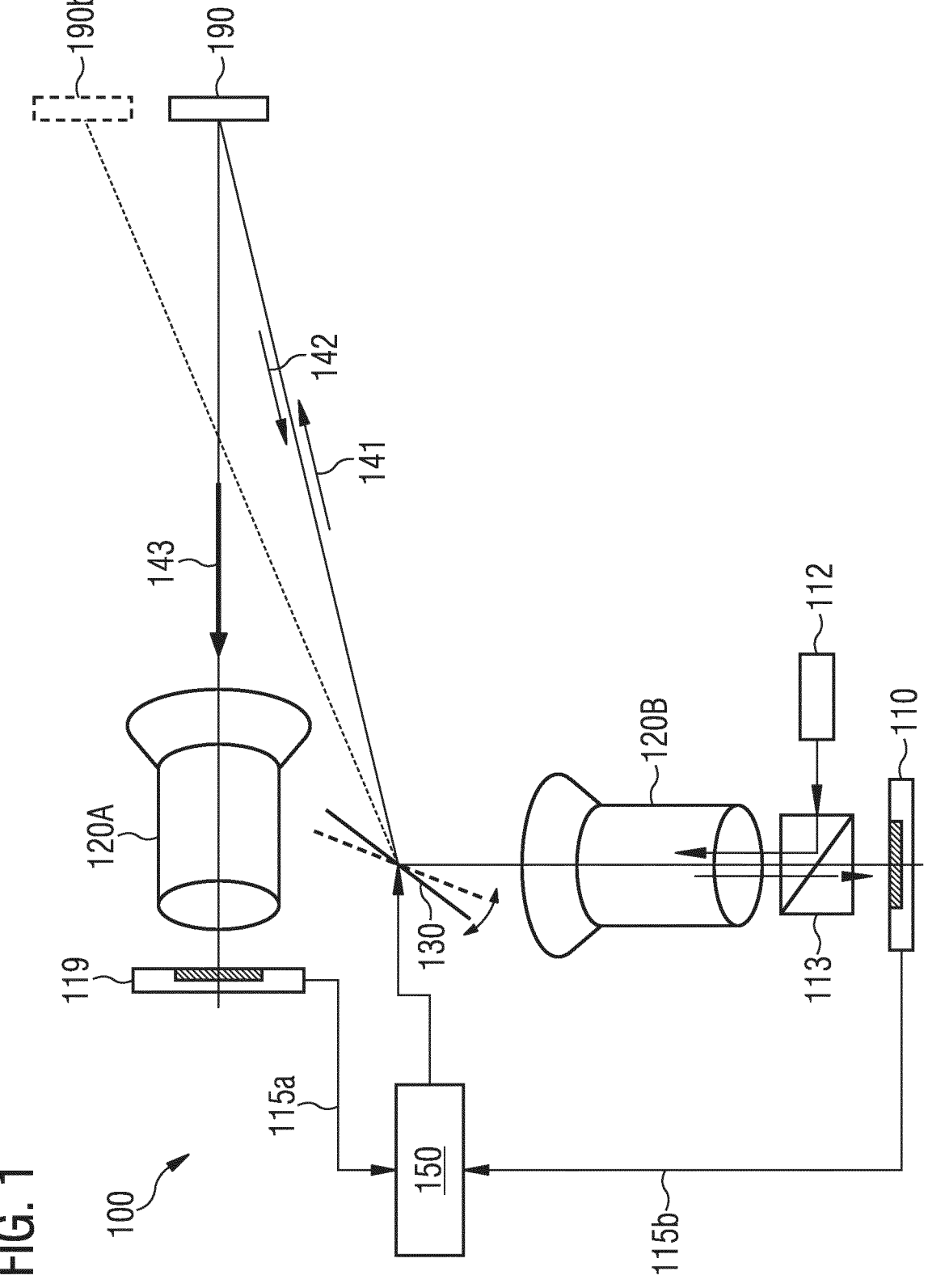
FIG. 1 illustrates a tracking camera, according to embodiments described herein.

FIG. 1 illustrates a tracking camera 100, according to embodiments described herein, including those illustrated in other figures. The tracking camera 100 includes a mirror assembly 130, a TOF sensor 110, a camera sensor 119, and a controller 150. The controller 150 can receive data 115a, 115b from the camera sensor 119 and the TOF sensor 110. The mirror assembly 130 can be adjusted by the controller 150 based on the data 115a, 115b. FIG. 1 shows camera sensor data 115a and TOF sensor data 115b. The TOF sensor can be a pixel array of up to about 800×600 pixels, for example.

The tracking camera 100 may track an object of interest, or object of interest, 190, 190b such as a fast moving object like a car or ball. As shown in FIG. 1, the object of interest 190 is at a first position at time t1, and the object of interest can be at a second position 190b at a later time t2. The controller 150 may adjust the orientation of the mirror assembly 130 such that a laser 112 is directed at the object of interest 190.

The camera sensor 119 and/or TOF sensor 110 may each be communicatively coupled to the controller 150, e.g. for data communication. The controller 150 can receive camera sensor data 115a from the camera sensor 119, and can adjust the mirror assembly 130 based on the camera sensor data 115a. The camera sensor 119 may be an event camera sensor, a frame camera sensor, or combination thereof. Event camera sensors may quickly provide camera sensor data 115a and allow for faster response of the tracking camera 100. An event camera can work asynchronously. Event camera sensors may have temporal resolution in hundreds of microseconds or even less, such as 20 microseconds, which may exceed the temporal resolution of conventionframe cameras. An event camera may be desirable for enabling faster tracking.

The tracking camera 100 as described herein may allow for recording images, measuring trajectories, angular velocities, object rotations, vibrations, and combinations thereof.

The tracking camera 100 includes a mirror assembly 130. The mirror assembly 130 of the tracking camera 100 may direct light from a laser 112, such as a laser for TOF determinations. The laser 112 can irradiate the object of interest and provide a TOF signal for the TOF sensor 110. The laser 112 can be a pulsed laser for providing a TOF signal. The laser 112 can be controlled by the controller 150. For example, the laser pulses can be adjusted for duration, duty cycle, repetition rate, and the like.

The laser 112, as depicted in FIG. 1, can be directed at the object of interest 190, e.g. by the position/orientation of the mirror assembly 130. A beam splitter 113 may allow the laser 112 to overlap the optical axis of the TOF sensor 110. The laser 112 and TOF sensor 110 may share an optical axis, e.g. an optical axis that is coaxial with the incident beam 141 of the laser. As illustrated in FIG. 1, the incident beam 141 from the laser 112 can be directed at the object of interest 190, e.g. via the adjustment of the mirror assembly 130. The mirror assembly 130, which can be dynamically adjusted e.g. by the controller 150, can direct the laser 112 at the object of interest.

The beam splitter 113 can intersect an optical axis of the tracking camera 100 and direct light from the laser 112 out of the tracking camera 100.

The mirror assembly 130 can include at least one actuatable mirror for adjustment. The adjustment can be made based on an adjustment signal from the controller 150. The mirror(s) of the mirror assembly 130 can include at least one of a galvanometer mirror, a microelectromechanical mirror, or a piezoelectric mirror.

The controller 150 of the tracking camera 100 may include at least one of a circuit, a computing device, a CPU, a programmable field array, or the like. The controller 150 may be programmed to perform part or all of the methods described herein, such as determining a mirror adjustment for a mirror assembly 130 based on data 115 from the camera sensor 119 and/or TOF sensor 110, particularly so as to enable tracking of a object of interest 190.

Data 115 can include camera sensor data 115a and/or TOF data 115b. Camera sensor data 115a can include event camera data, for example. The camera sensor 119 can transmit camera sensor data 115a to the controller 150. The TOF sensor 110 can transmit TOF data 115b to the controller 150. The controller 150 may be communicatively coupled to the mirror assembly 130.

FIG. 1 also shows, as part of the tracking camera 100, a lens assembly 120A, 120B which can be for collecting light for the TOF sensor 10 and/or camera sensor 119. The lens assembly of FIG. 1 is in two parts, with a first subassembly 120A for the camera sensor 119 and a second subassembly 120B for the TOF sensor 110.

Tracking fast-moving objects with a vision sensor with high levels of detail and measuring their distance can be challenging. Herein is described the use of actuated mirrors and a TOF camera. The device can also include an event camera. It is possible to measure the distance of an object of interest using actuated mirrors of a mirror assembly to train a laser on the object of interest, and to use the laser for time of flight (ToF) data. An image camera may also be used. Visual information at high spatial and temporal resolution can be provided. Alternatively/additionally, accurate bearing information (e.g. including position) of the object in 3D space can be possible.

An event camera can be used to capture visual information of a fast-moving object with high spatial and temporal resolution. A TOF camera can be used to measure depth information of the same object.

The light rays from the object of interest can be directed to an event camera by a mirror assembly which can be oriented such that the object is in the cameras field of view. By processing the output of the event camera at high rates (or continuously), the motion of the object of interest can be observed and the orientation of the mirrors can be adjusted accordingly, e.g. such that the object of interest remains in the cameras field view.

Using mirrors to control the gaze of an event camera enables the usage of a lens with a narrow angle of view and can result in a high-resolution image of the object. A laser beam with pulsed intensity can illuminate, via the mirrors, the object of interest, where it is scattered/reflected. A portion of the scattered/reflected light can be collected, e.g.

along the same optical path via the mirrors to a TOF sensor. The time interval between the moment when the laser illumination light emits from the laser until the moment when it is detected can be determined, e.g. to determine time-of-flight.

The distance between the object in the scene and the sensor can be calculated based on the time-of-flight, using the constant speed of light. Laser scanner or Light Detection and Ranging (LiDAR) systems, for example, can concentrate the laser to a single spot. A good signal to noise ratio (SNR) may be possible, particularly using lasers. The tracking cameras and methods described herein may be used outdoors even under bright sunlight conditions. The tracking cameras and methods described herein may detect objects at longer distance of 50 meters and beyond. The spatial information of an object of interest can be determined, for example, by directing the laser beam to be toward the object of interest. It is possible to combine the focused illumination of LiDAR systems with single shot and/or few-shot capturing by a TOF camera. The tracking cameras herein may allow faster determination of bearing information of objects of interest, e.g. compared to raster scanning systems.

Figures 2, 3:
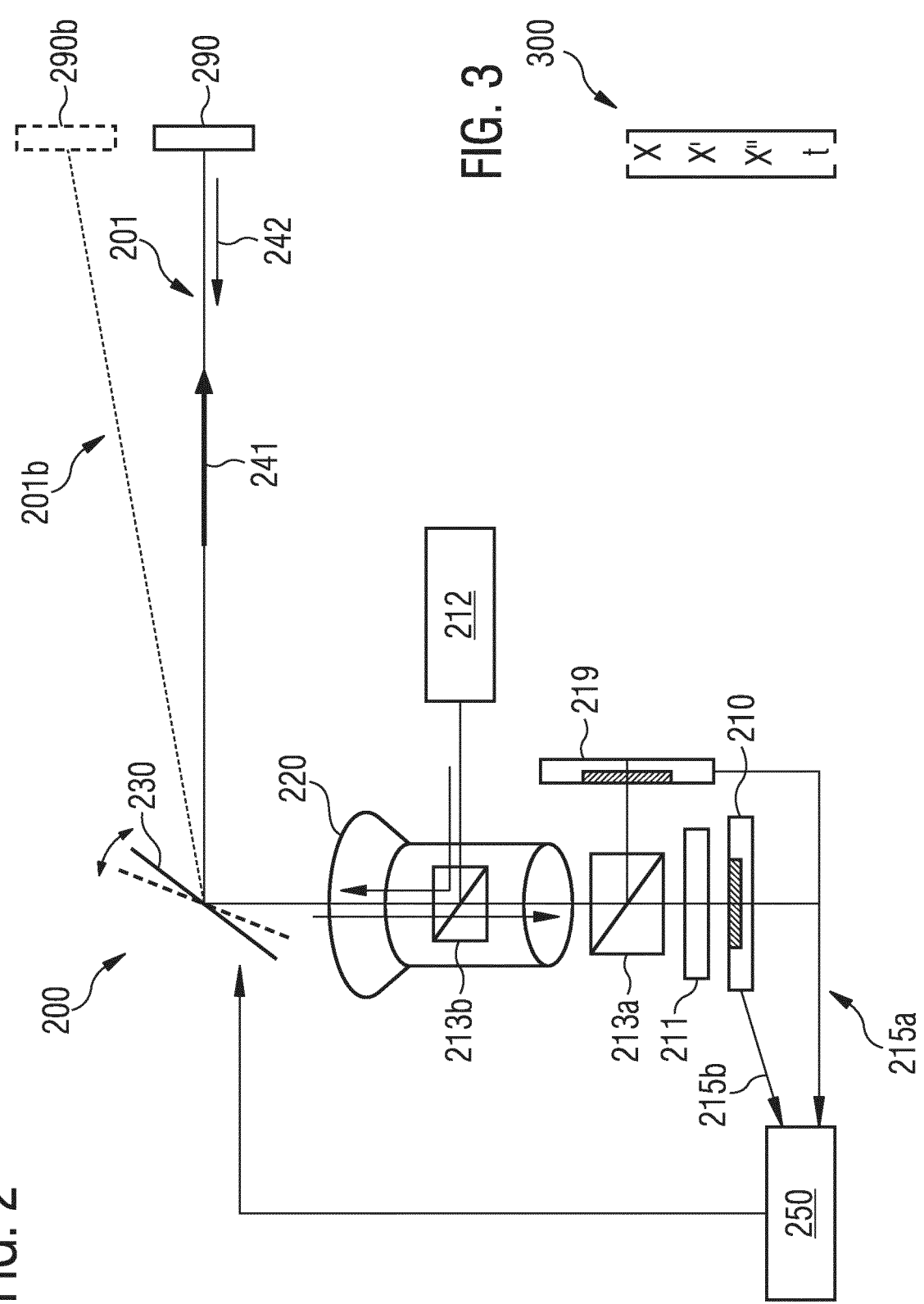
FIG. 2 illustrates a tracking camera, according to embodiments described herein.
FIG. 3 illustrates a bearing array, according to embodiments described herein.

FIG. 2 illustrates a tracking camera according to embodiments described herein, including those described with reference to other figures. The tracking camera 200 includes a mirror assembly 230, a TOF sensor 210, a camera sensor 219, and a controller 250. The controller 250 can receive data 215a, 215b from the camera sensor 219 and the TOF sensor 210. The mirror assembly 230 can be adjusted by the controller 250 based on the data 215a, 215b. FIG. 2 shows camera sensor data 215a and TOF sensor data 215b.

The controller 250 can determine the distance to the object of interest 290 based on the TOF data sensor data 215b.

The tracking camera 200 may track an object of interest, or object of interest, 290, 290b such as a fast moving object like a car or ball. As shown in FIG. 1, the object of interest 290 is at a first position at time t1, and the object of interest can be at a second position 290b at a later time t2. The controller 250 may adjust the orientation of the mirror assembly 230 such that a laser 212 is directed at the object of interest 290.

The camera sensor 219 and/or TOF sensor 210 may each be communicatively coupled to the controller 250, e.g. for data communication.

The tracking camera 200 includes a mirror assembly 230. The mirror assembly 230 of the tracking camera 200 may direct light from the laser 212, such as a laser for TOF determinations. The controller 250 can also be communicatively coupled to the mirror assembly 230, e.g. to send control signals for adjusting the orientation of mirror(s) of the mirror assembly.

The tracking camera 200 can have an optical axis 201 that is shared by the TOF sensor 210 and the camera sensor 119. The optical axis 201 can extend out of the tracking camera 200. The adjustment of the mirror assembly 230 may be in order to have the optical axis 201 reach the object of interest 290. The incident laser beam 241 may propagate along the optical axis 201. A scattered portion 242 of the laser, e.g. a portion that scatters off the object of interest 290, can be detected by the TOF sensor 210. A lens assembly 220 can collect the scattered portion 242 that is detected by the TOF sensor 210.

In FIG. 2, the collected light is collected by the lens assembly 220. The collected light is separated by a first beam splitter 213a which allows the camera sensor 219 to collect a first portion of the collected light and the TOF sensor 210 to collect a second portion of the collected light. A second beam splitter 213*b* may allow for the laser 212 to be directed along the optical axis of the tracking camera 200. The beam splitter 213*a* can intersect the optical axis 201 of the tracking camera 200. The beam splitter 213*a* can split light from a field of view, e.g. a field of view includes at least part of the object of interest 290, to each of the camera sensor 219 and the TOF sensor 210.

The camera sensor 219 can be sensitive to a visible band of light. For example, the tracking camera is configured so that the camera sensor 219 is sensitive to visible light up to approximately 750, 800, 850, or 900 nm.

An optical filter 211 can selectively pass a laser wavelength to the TOF sensor 210. For example, the laser wavelength can be in the infrared, and the optical filter 211 can be an infrared longpass or bandpass filter. For example, optical filter 211 is a bandpass filter adapted for the laser wavelength. For example, the laser wavelength can be between 850 nm and 1650 nm, for example, such as 850 nm or 940 nm. The beam splitter 213*a* may operate as the optical filter 211, at least partially, e.g. by separating light by wavelength such that the laser backscatter 242 is directed at the TOF sensor 210 and the camera sensor 219 receives other light, e.g. light for determination of an image and/or events, such as visible light. For example, the beam splitter 213*a* may be a dichroic beam splitter, such as passing 800 nm and higher to the TOF sensor 210 and the reflecting lower wavelengths to the camera sensor 219. A combination of optical filters can be used, such as to provide a narrow wavelength band that includes the laser wavelength to the TOF sensor 210; the bandwidth passed to the TOF sensor 210 may be less than 50 nm, or less than 20 nm, or less than 10 nm, or less than 5 nm, or less than 2 nm, for example. Providing a narrow bandwidth to the TOF sensor may increase the signal to noise ratio (SNR). The optical filter 211 can include a bandpass filter and/or a filter to block ambient light. Suppressing background light may increase SNR.

The beam splitter 213*b* may be placed inside the lens assembly, e.g. at the position of the pupil of the lens. It may be also placed in front or behind the lens assembly.

The TOF sensor 210 may be a Si based detector. It is possible to use an infrared sensor as the TOF sensor 210, for example an InGaAs sensor. It may be advantageous to have the TOF sensor 210 be in the infrared and the camera sensor 219 in the visible, for example. The ToF sensor 210 may be operated as a single pixel detector. Alternatively/additionally, the TOF sensor 210 may be a single pixel detector, such as a single photodiode or photomultiplier. It may be advantageous to utilize a single channel detection scheme for the TOF signal, in order to increase signal to noise ratio. A single channel TOF sensor 210 which is responsive to electromagnetic radiation with wavelengths up to 1700 nm or possibly 2600 nm is particularly contemplated. The wavelength of the laser light may be, for example 1550 nm. A wavelength of 1550 nm may be less hazardous for the human eye.

The tracking camera 200 can have an optical axis 201 that extends out from the tracking camera 200 to the field of view, e.g. to the object of interest 290 within the field of view. The optical axis 201, particularly the part external to the tracking camera 200 as shown in FIG. 2, is movable, based on movements of the mirror(s) of the mirror assembly 230. In an embodiment, when the mirror assembly 230 is adjusted, the optical axis 201 of the tracking camera 200 moves.

For example, the controller 250 determines, or effectively determines, a target direction, and transmits an adjustment signal to the mirror assembly 230 such that the optical axis 201 moves toward the target direction such as a target direction 201*b* and/or second position. The optical axis 201 may be directed at the object of interest 290. At another time, t2, when the object of interest is at a second position 290*b*, or expected to be at the second position 290*b*, the mirror assembly 230 may be adjusted such that the optical axis 201 extends to the second position 290*b*. The controller can determine the adjustment and/or adjustment signal to direct the laser at the object of interest (e.g. by actuation of the mirror(s) of the mirror assembly 230).

The tracking camera 200 of FIG. 2 may be more compact than that shown in FIG. 1. It may be desirable to have a smaller form of the tracking camera 200. The lens assembly 220 of FIG. 2 may serve as an imaging lens for the camera sensor 219 and the TOF sensor 210. The lens assembly 220 may be configured to provide a relatively small field of view, e.g. such that the image of the object of interest 290 nearly fills the camera sensor 219.

Beams from the laser 212 may be directed toward the object of interest 290 by a beam splitter 213*b* and/or the mirror assembly 230. The light source 212 may be communicatively coupled to the controller. Irradiating the object of interest 290 may aid in TOF acquisition. Alternatively/additionally, irradiating the object of interest 290 may allow the object of interest to be picked out from the environment more easily, particularly if the light source is intensity modulated in such a way that can be detected by the sensor(s) 210, 219. In an embodiment, detecting the irradiated object of interest 290 with the camera sensor 219 may be enabled by allowing at least a portion of the laser scatter 242 to pass to the camera sensor 219. Allowing some laser scatter 242 to reach the camera sensor 219 may allow the object of interest 290 to be recognized more easily and/or tracked more easily.

For example, the camera sensor 219 may be an event camera that registers events arising from varying lighting conditions. A modulated light source 212, such as a pulsed laser, can generate varying lighting conditions to trigger events of the camera sensor 219. Alternatively/additionally, the intensity of the scattered laser 242 (e.g. reflected) off the object of interest 290 may be significantly brighter than the environment. An intensity modulated (e.g. flashing) laser 212 can be used to irradiate the object of interest 290 and highlight it over the background/environment to facilitate the recognition/detection/tracking of the object of interest 290.

In an embodiment, at least one of the sensors 210, 219 can be time-synchronized with the laser 212, particularly the TOF sensor 210. The known positions and/or time synchronicity can be used to determine bearing information, such as the bearing array representative of the object of interest 290.

As illustrated in FIG. 2, the beam splitter 213*a*, shown to be in the optical path 201, e.g. intersecting the optical path 201 between the sensors 210, 219 and the object of interest 290, may allow the tracking camera 200 to collect light from the object of interest 290 and/or a field of view that includes at least part of the object of interest 290. The beam splitter 213*a* may split the light from the object of interest 290 such that the light goes to the camera sensor 219 and the TOF sensor 210 simultaneously.

The beam splitter 213*b* can aid in coupling the laser 212 to the tracking camera's optical axis 201.

For example, the camera sensor 219 can be a conventional/frame camera sensor (such as a wide angle camera)

which may facilitate object recognition by collecting light from a region, particularly a wide or variable region. Use of a camera sensor 219 with the TOF sensor 210 may facilitate the determination of 3D bearing information of the object of interest 290.

FIG. 3 illustrates a bearing array, according to embodiments described herein which may be combined with other embodiments described herein, particularly those illustrated in any of the other accompanying figures. An object of interest can be modeled using a bearing array 300.

A bearing array 300 can be based on the data 115. The bearing array 300 may correspond to the object of interest 190, such as a position (x, y, z) thereof. A bearing array 300 may include any of x, x', x", t. Here, x may be a 1, 2, or 3 dimensional position; and x' and x" may be 1, 2, or 3 dimensional velocities and accelerations, respectively. The bearing array may include velocity and/or speed information (e.g. x', y', |x'+y'|), and may alternatively/additionally include acceleration information (x"). The bearing array 300 may include time information, t. A bearing array can be a set of determined positions at discrete times, t, for example. Each discrete time of a bearing array may have at least one of a position, velocity, or acceleration. Bearing arrays 300 may be used in determining how to adjust the mirror assembly, how to determine the position of the object of interest at a given time (e.g. a current time or future time), and/or how to move the optical axis of the tracking camera, for example.

Motion estimation algorithms may determine and/or predict bearing arrays 300 and/or bearing information. Motion estimation algorithms may help to determine/predict the position of the object of interest at a time instance, e.g. a current or future time, t1 or t2.

Figure 4:
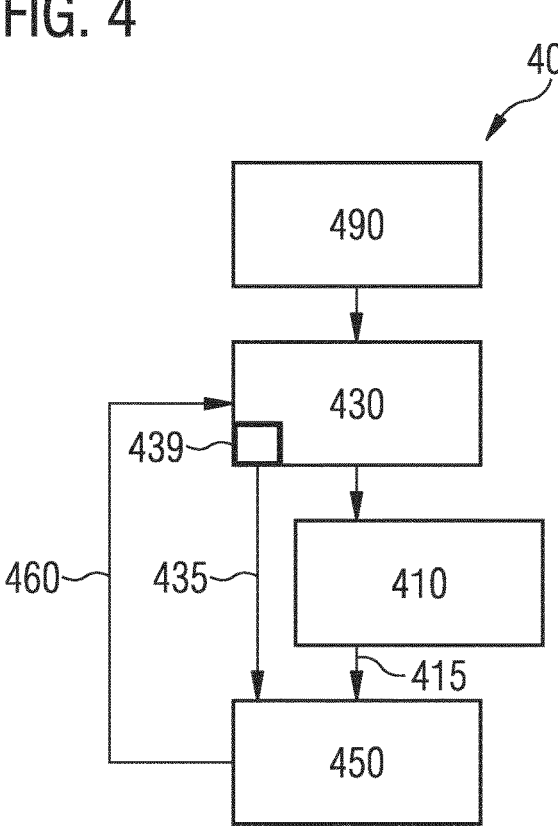
FIG. 4 illustrates a block diagram of a system, method, or device for tracking, according to embodiments described herein.

FIG. 4 illustrates a block diagram of a system, method, or device for tracking, according to embodiments described herein which may be combined with other embodiments described herein, particularly those illustrated in any of the other accompanying figures. FIG. 4 can illustrate a tracking camera 400. An object of interest 490 can be in a line of sight and/or field of view of the tracking camera, particularly the sensor(s) 410 thereof and/or mirror assembly 430 thereof. The mirror assembly 430 may direct light to the sensor(s) 410 (e.g. the camera sensor and/or TOF sensor).

The controller 450 can accumulate/receive data 415 from the sensor(s) 410. The controller 450 can determine the adjustment signal 460 based on the data 415 and can transmit the adjustment signal 460 to the mirror assembly 430 for adjusting the mirror assembly 430. The mirror assembly 430 may be adjusted such that the object of interest 490 is kept within a line of sight of the camera sensor 410, e.g. such that the image of the object of interest 490 overlaps and/or is within the sensor(s) 410, such as centered in the sensor(s) 410.

Alternatively/additionally, the optical axis of the tracking camera can be moved so that it is directed at the object of interest 490.

The controller 450 may receive/accumulate, for a time interval, data 415. The data 415 can be used by the controller 450 to determine adjustment signal 460. The adjustment signal 460 may be based on the bearing array (x, x', x", t).

The bearing array (x, x', x", t) optionally includes at least one element in regard to a time, which may correspond to a previous time, current, or future time. For example, the bearing array has elements corresponding to an instant coordinate (x, y) of the object of interest, and a time of a corresponding event from an event camera sensor. In another example, the bearing array has elements corresponding to a determined average position (e.g. x, y, and z), and average time of a plurality of events from the event camera sensor and/or TOF sensor used to determine the corresponding average position. In another example, the bearing array has elements corresponding to an instant coordinate (x, y) of the object of interest as determined from an event camera sensor and an instant coordinate z determined from TOF sensor data, such as by extrapolation and/or averaging (such as weighted averaging) of z at time t using TOF sensor data acquired for a set of times near time t.

It is conceivable that the bearing array (x, x', x", t) is determined by the controller 450 for a projected position of the object of interest 490 at a future time, t, e.g. a future time when the mirror assembly 430 is moved to the position encoded with the adjustment signal 460. Such a determination may take into account the amount of time it takes to adjust the mirror assembly 430, because of finite response times of the mirror(s) of the mirror assembly (430). Alternatively/additionally, the bearing array may include at least one element with a time corresponding to a previous time.

For example, the controller 450 may (i) accumulate data 415 for a time interval, then (ii) determine a common time within the time interval, and (iii) estimate a bearing array element (x, x', x", t) at the common time, based on the accumulated data 415. The controller 450 may determine the adjustment signal 460 based on the bearing array element (x, x', x", $t_c$) at the common time, $t_c$, or some other time to, particularly after the common time. The time to may correspond to the time at which the mirror(s) is expected to reach the new position after the adjustment signal 460 is transmitted. The time, to, may be the time at which the adjustment signal 460 is transmitted and/or the data 415 is received by the controller 450, which may be useful for situations in which the mirror(s) adjustment is sufficiently rapid compared to motion of the object of interest 490.

The steps (i), (ii), and (iii) described above may be executed, and then (iv) an adjustment of the mirror assembly can be made; and the steps i-iv can be repeated over a subsequent time interval. Repeating the steps can be done to track the object.

The bearing array may be used to determine the trajectory of the object of interest 190, 290 for example. Alternatively/additionally, the bearing array may be used to determine the adjustment signal 460.

The controller 450 may adjust an accumulated set of events from an event camera sensor so that the accumulated events have a common time, $t_c$. The common time $t_c$ may be useful for motion compensation, e.g. that occurring over the duration of the data accumulation. It is possible to synthesize an image frame at the common time $t_c$, such as by accumulating data 415 (and/or the mirror positions, e.g. using a history of adjustment signals 460 or feedback signals from the mirror assembly).

In an embodiment, asynchronous data (e.g. of the data 415) of an event camera sensor (e.g. the sensor(s) 410 including an event camera sensor) can be processed asynchronously, as the data 415 is transmitted to the controller 450. For example, multiple estimates (e.g. the bearing array or bearing estimates) at different points in time might be combined probabilistically, e.g., using a recursive filter like an Extended Kalman Filter which may also include a model of the object's dynamics. A synchronous or an asynchronous method or control algorithm may be used to actuate the mirrors (e.g. determine the adjustment signal 460).

The actuation and/or adjustment signal 460 may be based on the difference of the estimated position of the object in the image coordinates (e.g. corresponding to the position elements of the bearing array element (such as x, y in the frame of reference of the camera sensor) and the center of the sensor(s) 410. The actuation and/or adjustment signal 460 may be determined such that the object is (e.g. repeatedly) centered in the field of view of the sensor(s) 410. Alternatively/additionally, the actuation and/or adjustment signal 460 may be determined to direct an optical axis 201 of the tracking camera 200 at the object of interest 290.

The controller 450 may determine a bearing array (x, x', x") in any coordinate frame and/or any coordinate system, such as a coordinate system having the tracking camera at the origin. The bearing array may include coordinates related to the orientation of the mirror(s) of the mirror assembly 430, such as a mirror orientation array (θ, φ, t).

The adjustment signal 460 may, alternatively/additionally, be based on the mirror orientation array (θ, φ, t) which may be an array of previous and/or desired/target orientations of the mirror(s) of the mirror assembly 430. The mirror orientation array (θ, φ, t), may be determined based on the data based on data 415, and/or other determinations such as the bearing array and/or feedback signals from the mirror assembly indicative of mirror positions.

According to embodiments described herein, the tracking camera may be controlled/operated by the controller. The operation may include receiving data from at least one camera sensor; determining an adjustment signal based on the data; transmitting the adjustment signal to a mirror assembly; and adjusting the mirror assembly according to the adjustment signal. The operation of the tracking camera may also include collecting light and forming an image of a object of interest on the camera sensor. The collected light may pass through the lens assembly, including a pupil position near or within the mirror assembly and/or lens assembly.

The controller 450 may estimate a bearing array (x, x', x", t) based on the data 415. The bearing array (x, x', x", t) can correspond to a object of interest 190 (e.g. a position thereof). The adjustment signal can be determined based on the bearing array.

The communicative coupling between the controller 450 and the mirror assembly 430 may be two-way. For example, the controller 450 sends an adjustment signal 460 to the mirror assembly 430. Alternatively/additionally, the mirror assembly 430, and/or an orientation feedback system 439 (which may be part of the mirror assembly 430), sends a mirror assembly status 435 to the controller 450. The mirror assembly status 435 may be a position/orientation signal such as data regarding the position(s) and/or orientation(s) of mirror(s) of the mirror assembly 430, such as the mirror orientation array (θ, φ, t) and/or data for the mirror orientation array (θ, φ).

In an embodiment that may be combined with any other embodiment described herein, the tracking camera 400 includes an orientation feedback system 439 communicatively coupled to the controller 150 for communicating a mirror assembly status, such as mirror position(s)/orientation(s), and/or mirror orientation array (θ, φ, t). The orientation feedback system 439 may communicate a mirror position/orientation for at least one mirror of the mirror assembly (up to possibly each mirror of the mirror assembly), and optionally includes time information such as a time stamp.

The orientation feedback system 439 may utilize capacitive sensing, for example. The orientation feedback system 439 may provide data to the controller 450 which can be used to determine the position/direction of a object of interest 490, and/or the direction of the optical path leading into the tracking camera 400, and/or the position/direction of an irradiated spot of the field of view 480.

For example, the controller 450 may transmit the adjustment signal such that the optical axis of the tracking camera 400 (which may extend to the center of the sensor(s) 410) is moved to a target direction (e.g. while extending also to the center of the sensor(s) 410) based on a bearing array (x, x', x", t). Alternatively/additionally, the adjustment signal 460 can be based on the target direction, which may be determined based on the data 415.

For example, the controller 450 may transmit the adjustment signal 460 such that the optical axis 201 of the tracking camera 200 (which may extend to the center of the sensor(s) 410) is moved to the target direction (e.g. while extending also to the center of the sensor(s) 410) based on the bearing array (x, x', x", t). Alternatively/additionally, the adjustment signal 460 can be based on the target direction 202, which may be determined based on the data 415.

The target direction may be effectively determined such that the object of interest 190, 290 overlaps or is within the field of view of at least one of the sensors 410, such as centered therein. Alternatively/additionally, the controller 450 may determine a plurality of target directions, such as in order to generate a pattern of saccade movements around the object of interest 190, 290. For example, the controller 450 may determine a plurality of adjustment signals 460, such as based on an accumulation of data 415 (e.g. throughout a time interval). The plurality of adjustment signals 460, may be sequentially transmitted to the mirror assembly 430, such that the optical axis 201 moves sequentially to each of the plurality of target directions.

The plurality of target directions and/or adjustment signals 460 may be such that the object of interest 190, 290 overlaps or is within the field of view of the sensor(s) 410 with each movement of the optical axis 201 to each target direction.

In an embodiment, the controller 450 determines a plurality of target directions and/or adjustment signals 460 asynchronously from the data 415. The optical axis can be effectively moved away from the object of interest 190, 290 such as intermittently away from the object of interest 109, 290, e.g. around the object of interest 190, 290. In an embodiment, the optical axis 201 is effectively moved alternately away from the object of interest 190, 290 and toward the object of interest 190, 290. Such movements may allow environmental data to also be taken into account for environmental effects on the movement of the object of interest 190, 290 (such as anticipated collisions).

In an embodiment, the adjustment signals 460 can be transmitted at regular time intervals to the mirror assembly 430 from the controller 450. The adjustment signals 460 can be determined by the controller 450 based on data 415 accumulated between adjustments.

The tracked object 490 may be irradiated/illuminated by a light source such as a laser. The light source may be communicatively coupled to the controller 450, which may control modulation of the light source. The light source may be directed by the mirror assembly 430, such as the same mirrors used to direct the light of the field of view into the camera sensor 410. Irradiating the tracked object 490 may provide for a TOF signal. The light source may increase signal:noise and allow for more accurate tracking. Irradiating the tracked object 490 may allow tracking to occur in dark conditions. Alternatively/additionally, irradiating the tracked object 490 may allow the tracked object to be picked out from the environment more easily, particularly if the light source is intensity modulated so as to trigger the camera sensor 410.

Figure 5:
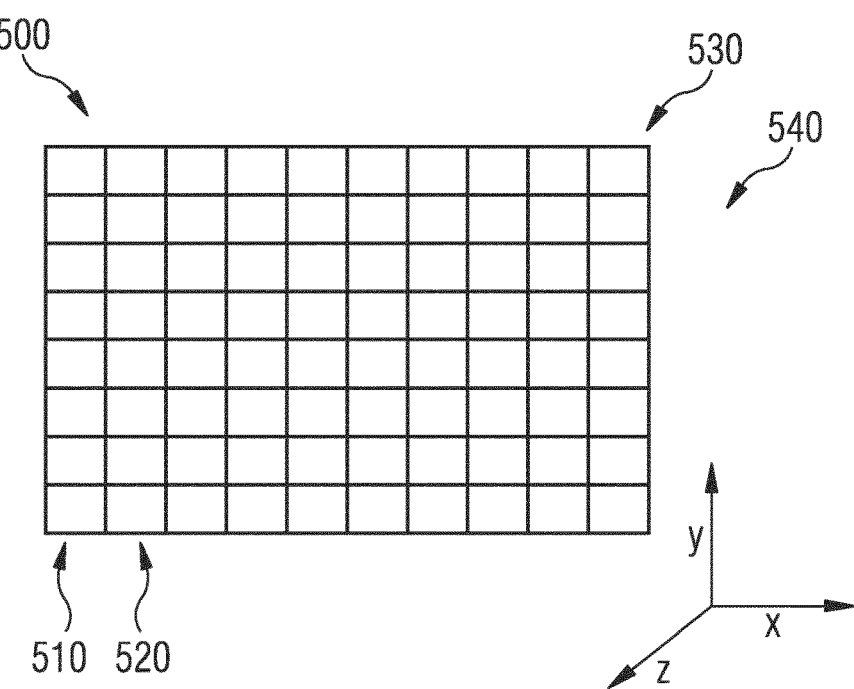
FIG. 5 illustrates a hybrid sensor according to embodiments described herein.

FIG. 5 illustrates a hybrid sensor 500 according to embodiments described herein. Any of the tracking cameras described herein may include a hybrid sensor 500, which may include a camera sensor 530 and a TOF sensor 540. The hybrid sensor 500 may including TOF pixels 510 for TOF data (e.g. for determining TOF and/or distance), and camera sensor pixels 520 for imaging and/or event data. Event data may be determined by event pixels which are camera sensor pixels configured for event camera operation. The pixels 510, 520 can generate data for transmission to the controller. Alternatively/additionally, camera sensor pixels 520 may be configured for generating image data for transmitting image data such as an image frame to the controller. Alternatively, camera sensor pixels may be configured to generate event data for transmitting event data to the controller.

For example, the hybrid sensor 500 includes TOF pixels; and, in addition to the TOF pixels, the hybrid sensor 500 may also include event pixels and/or image pixels.

FIG. 5 illustrates a coordinate system, x, y, z, that can be associated with the bearing array and/or bearing information described herein, regardless of sensor type (camera sensor, TOF camera, or hybrid). Coordinates x and y can correspond to rows and columns of the sensor 500 and/or x and y directions of the field of view of the object of interest. Coordinate z can be perpendicular to the plane of the sensor 500, e.g. connecting the sensor (such as the center thereof) to the object of interest and/or center of the field of view. The distance to the object may be measured along z. When the mirror assembly is adjusted, it is possible for the coordinates x, y, and/or z to move, e.g. relative to another frame of reference.

In an example, using FIG. 1 to illustrate, a first lens assembly 120A and an image sensor (e.g. a camera sensor 119) capture an image of a scene. A controller 150 which may include a processing unit can detect an object of interest 190 at a certain time instance t1 within the scene. The controller 150 can provide information about the angular position, as seen from the lens, of the object of interest 190 to a control unit of the controller 150. The controller 150 can adjust the mirror assembly 130 to track the position of the object of interest 190.

A laser 112 can emit a laser beam 141 which can be coupled by a beam splitter 113 into the optical axis of a second lens 120B. The controller 150 can send a control signal to a mirror assembly 130, which can orient (e.g. by rotation) to a position such that the incident laser beam 141 is directed towards the object of interest 190 and is illuminating the object of interest 190.

The lateral displacement between lens subassembly 120A and mirror assembly 130 is small compared to the distance between mirror assembly 130 and object of interest 190, to reduce error in the determination of the angular position. A portion 142 of the illumination light (e.g. the incident light 141 from the laser 112) can be scattered/reflected from the object of interest 190, and can travel back the reverse direction of the laser beam, entering the lens 120B and finally is captured by a TOF sensor 110. Another portion 143 of the illumination light can be collected by the lens 120A and be detected by the camera sensor 119.

A controller 150 can process the TOF signal and calculate depth information of the object of interest 190. At a later time instance t2, when the object of interest 190 may have moved to another position 190b, this new position is again detected by the controller 150. The controller 150 can set the actuatable mirror assembly 130 to a new position such that the incident laser beam 141 again illuminates the moved object of interest 190 at a later time instance t2.

When the size and distance of the object of interest is predictable within a certain range, the field of view of the lens assembly 120B may be adapted such that the image of the object of interest almost fills the complete pixel area of the TOF sensor. This may lead to a magnified depth map of the object of interest 190. The field of view (FOV) of the lens assembly 120B may be set based on an expected depth and estimated size of the object of interest. For example, the FOV of a lens assembly for a golf ball at 50 meters can be configured to be narrower than a lens assembly configured for tracking automobiles at 3-10 meters.

Figure 6:
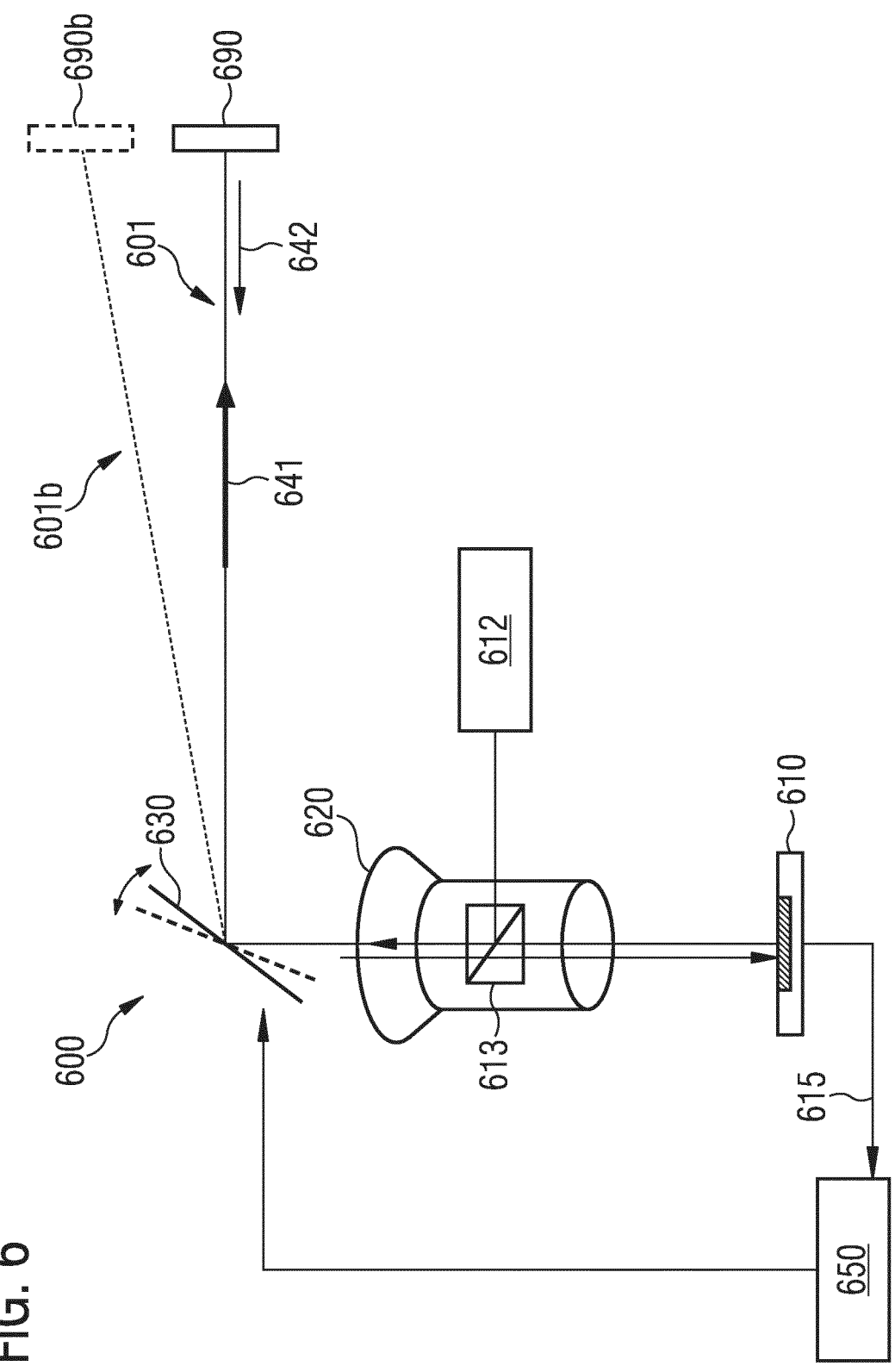
FIG. 6 illustrates a tracking camera, according to embodiments described herein.

FIG. 6 illustrates a tracking camera, according to embodiments described herein, including those described with reference to other figures. The tracking camera 600 includes a mirror assembly 630, a sensor 610, and a controller 650. The controller 650 can receive data 615 from the sensor 610. The sensor can include a TOF sensor and a camera sensor. For example, the sensor 610 is a hybrid sensor, such as of the type of FIG. 5. The mirror assembly 630 can be adjusted by the controller 650 based on the data 615.

The laser 612 can be directed at the object of interest 690, such as through the actuation of the mirror assembly 630. A beam splitter 613 can allow the laser 612 to be directed along the optical axis 601 of the tracking camera. The optical axis 601 of the tracking camera 600 can be moved, such as by moving the mirror assembly 630, e.g. to a target direction 601b. For example, at a later time, the object of interest may be at a second position 690b. The mirror assembly 630 may be actuated such that the laser 612 is trained on the object of interest 690. It can be advantageous to focus the laser energy on the object of interest 690, such as to provide high SNR for the TOF sensor and/or the camera sensor. The target direction 601b may be determined by the controller 650, e.g. based on the data 615 and/or the bearing array 300.

FIG. 6 shows the incident laser beam 641 and scattered laser 642. The scattered laser 642 can be collected by the lens assembly 620 and the collected light passed to the sensor 610.

A tracking camera 100, 600 that includes an event camera sensor may offer one or more advantages over conventional/frame cameras, such a reducing the amount of data for processing by the controller 150, 600. A tracked object 190 may cover only a small portion of an image frame of a conventional/frame camera. This may cause a conventional/frame camera to image a tracked object 190 at reduced resolution, since much of the image frame may be taken up by background. Much of the image frame data from a conventional camera may be filtered/ignored by a tracking algorithm when the object of interest 190 takes up a relatively small fraction of the image frame. Alternatively/additionally, a frame camera, by transmitting an entire image frame multiple times per second, may provide images which may also be used for analysis, for example. It is contemplated that the tracking algorithm of the tracking camera 100, 600 may ignore some data, particularly background portion(s) of images from a frame camera.

Utilizing an event camera sensor 119 may improve tracking, e.g. by providing more relevant data to the controller 150 for determining the position of the tracking object 190. Efficient use of computational power may also aid in rapidly and accurately determining optical, mechanical, and/or digital adjustments for tracking the tracked object 190, and may reduce power requirements.

Event camera data can include at least one event datum which may include a pixel x-position, a pixel y-position, a polarity, and a time stamp. The data 115 may be generated asynchronously. Each individual asynchronous event, such as an event from an event camera, can generate a set of data that includes at least one of: pixel x-position, pixel y-position, polarity, a time stamp, and any combination thereof. The term "data" may refer to a plurality of sets of data, e.g. each set thereof produced from a respective individual (asynchronous) event. Each individual asynchronous event may be time stamped. For example, event camera data corresponding to a single event includes a polarity which indicates whether the event is in response to an increase or decrease in intensity; the data also including the pixel position, x, y, of the event and a time stamp.

In an embodiment, such as any embodiment described herein, the mirror assembly 130, 630 has at least one actuatable mirror. The actuatable mirror(s) may be a galvanometer mirror(s). It is envisioned that the response time of the actuatable mirror(s) can be less than 500 µs, 300 µs, 200 µs, or 100 µs for movements of up to 0.5° or 0.2°, or 0.1°. Rapidly responsive mirrors may allow for faster tracking. Particularly, in comparison to movement of the body 111 of the tracking camera, e.g. using a pan/tilt mechanism, movable mirrors for tracking motion may allow faster response times. Other types of mirrors for the actuatable mirror(s) are contemplated, such as microelectromechanical (system) mirrors (MEMs mirrors) and piezoelectric mirrors (PZ mirrors). Furthermore, low-mass mirrors may also lead to improving responsivity, by having lower inertia, and therefore faster response.

Rapidly moving mirrors, e.g. having high bandwidth, short settling time, and/or low latency, may work synergistically with the sensor(s) 110, 119, e.g. having excellent temporal resolution and/or low latency, to provide for rapid tracking. For example, motion blur can be reduced. Each of the mirror assembly 130 and sensor(s) 110, 119, as described herein, particularly working in synergy, can allow for accurate/rapid bearing information of the tracked object 190.

For example, the mirror assembly 130, 630 can include a 2D scanning mirror that rotates about 2 axes, e.g. a horizontal and a vertical axis. Alternatively, the mirror assembly may include two subsequent 1D scanning mirrors aligned on the same optical axis, the first 1D scanning mirror rotating around the horizontal axis and the second 1D scanning mirror rotating around the vertical axis.

EXAMPLES

Note that the present technology can also be configured as described below.

(1). A tracking camera comprising:
a mirror assembly;
a camera sensor;
a TOF sensor;
and a controller; wherein
the controller is configured to:
    receive data from the camera sensor and the TOF sensor, and adjust the mirror assembly based on the data.
(2) The tracking camera of (1), further comprising:
a lens assembly for collecting light for the TOF sensor and the camera sensor.
(3) The tracking camera of (1) or (2), wherein
the camera sensor includes at least one of a frame camera or an event camera, and the camera sensor data includes at least one of image data or event data.

(4) The tracking camera of any of (1)-(3), wherein
the mirror assembly comprises an actuatable mirror configured for adjustment based on an adjustment signal from the controller.
(5) The tracking camera of any of (4), wherein
the actuatable mirror of the mirror assembly is a galvanometer mirror, a microelectromechanical mirror, or a piezoelectric mirror.
(6) The tracking camera of (1)-(5), further comprising
an orientation feedback system communicatively coupled to the controller for communicating a mirror assembly status.
(7) The tracking camera of any of (4)-(6), wherein
the controller is configured to:
    determine the adjustment signal based on the data, and
    transmit the adjustment signal to the mirror assembly for adjusting the mirror assembly.
(8) The tracking camera of any of (4)-(7), wherein
the controller is configured to:
    receive the data for a time interval, and
    estimate a bearing array corresponding to a tracked object based on the data;
    wherein
the adjustment signal is based on the bearing array.
(9) The tracking camera of any of (4)-(8), wherein
the controller is configured to:
    transmit the adjustment signal such that an optical axis of the tracking camera which extends out of the tracking camera is moved to a target direction based on the bearing array.
(10) The tracking camera of any of (1)-(9), further comprising:
a hybrid sensor which includes the camera sensor and the TOF sensor, the hybrid sensor including pixels for TOF which are configured for determining the time of flight.
(11) The tracking camera of any of (1)-(10), further comprising:
a beam splitter configured to split light from a field of view to each of the camera sensor and the TOF sensor.
(12) The tracking camera of any of (1)-(11), wherein:
the lens assembly includes a first subassembly for collecting light for the camera sensor and a second subassembly for collecting light for the TOF sensor.
(13) The tracking camera of any of (1)-(12), further comprising:
a laser for irradiating an object of interest and for providing a TOF signal for the TOF sensor.
(14) The tracking camera of any of (1)-(13), further comprising:
a beamsplitter intersecting an optical axis of the tracking camera and configured to direct light from the laser out of the tracking camera.
(15) A method of operating a tracking camera, comprising:
    receiving data from a TOF sensor and a camera sensor;
    determining an adjustment signal based on the data;
    transmitting the adjustment signal to a mirror assembly;
    adjusting the mirror assembly according to the adjustment signal.
(16) The method of operating a tracking camera of (15), further comprising:
    collecting light from a pupil position which is within 2 cm of the mirror assembly, forming an image of a tracked object on the camera sensor.

(17) The method of operating a tracking camera of (15) or (16), further comprising:

estimating a bearing array based on the data, the bearing array corresponding to a tracked object, wherein determining the adjustment signal is based on the bearing array.

(18) The method of operating a tracking camera of any of (15)-(17), further comprising:

accumulating the data for a time interval;

determining a common time within the time interval; wherein the bearing array includes an element at the common time based on the accumulated data.

(19) A non-transitory computer-readable medium computer program having a program code for, when executed on a processor, causing the execution of the method according to any of (15)-(18).

The aspects and features mentioned and described together with one or more of the previously detailed examples and figures, may as well be combined with one or more of the other examples in order to replace a like feature of the other example or in order to additionally introduce the feature to the other example.

Herein, a flow chart, a flow diagram, a state transition diagram, a pseudo code, and the like may represent various processes, operations or steps, which may, for instance, be substantially represented in transitory and/or non-transitory machine readable medium (e.g. a floppy disc, a DVD, a Blu-Ray, a CD, a ROM, a PROM, and EPROM, an EEPROM or a FLASH memory) and executable by a processor or a programmable hardware, whether or not such processor or a programmable hardware is explicitly shown. Methods disclosed in the specification or in the claims may be implemented by a device having means for performing each of the respective acts of these methods.

A non-transitory computer-readable medium computer program may have a program code for, when executed on a processor, causing the execution of any of the methods described herein.

It is to be understood that the disclosure of multiple acts, processes, operations, steps or functions disclosed in the specification or claims are not to be construed to be limited in a specific order, unless explicitly or implicitly described otherwise. In some examples a described act, function, process, operation, or step may include or may be broken into multiple subordinate acts, functions, processes, operations and/or steps.

Reference numerals are given to aid in understanding and are not intended to be limiting.

It will be understood that when a feature is referred to as being "connected" or "coupled" to another element, the features may be directly connected, or coupled via one or more intervening elements.

Herein, the term "irradiate" may be used interchangeably with "illuminate." Herein, "actuatable" and "adjustable" may be used interchangeably; for example an adjustable mirror may be an actuatable mirror. Herein a "controller" may include, for example, at least one processor such as a computer processor, computing device (such as a programmable electronic device), or the like, including possibly a network of computing devices. "Controller" and "control unit" may be used interchangeably. Herein, "bearing array" may be a single element array, a two element array, or greater; for example, the bearing array may be x and y coordinates corresponding to the position of the object of interest in the image plane formed by the lens assembly. Herein, "conventional camera" may be used interchangeably with "frame camera." A conventional camera and/or frame camera may be a high-speed camera. Herein, "object of interest" and "target object" may be used interchangeably.

Herein, coordinates x, y, z, such as those used in the bearing information and/or bearing array, may be in the frame of reference of the tracking camera, such as at least one sensor thereof. Coordinates x and y may be associated with the x, y dimensions of the camera and/or camera sensor (e.g. the camera sensor). The z direction may be associated with the distance from a sensor, or the front of the camera, e.g. the tracking camera, and may be associated with the part of the optical axis that extends out from the tracking camera. It is possible that, in another coordinate frame, e.g. an "absolute" coordinate frame, e.g. a coordinate frame of the user/observer or a second camera, the coordinate(s) change(s) direction. For example, the z direction may change in response to changes in the mirror orientations of the tracking camera.

Herein an aperture and/or pupil may block some light rays and allow others to pass. An aperture and/or pupil may limit light passing along/near the optical axis. For example, an aperture and/or pupil on the optical axis of the tracking camera, such as within the lens assembly and/or mirror assembly, may allow light rays near the optical axis to pass and block rays that are farther away from the optical axis (e.g. farther off-axis). Herein a "pupil position" may be a position where an aperture is placed, such as a lens aperture stop. A pupil position may be where light rays converge on the optical axis. A pupil position may be at a position of an intermediate image within the tracking camera. Herein, pupil position and pupil point may be used interchangeably.

Herein, a trailing "(s)" or "(es)" indicates an optional plurality. Thus, for example, "mirror(s)" means "one or more mirrors," "at least one mirror," or "a mirror and optionally more mirrors." Herein a slash "/" indicates "and/or" which conveys "'and' or 'or'". Thus "A/B" means "A and/or B;" equivalently, "A/B" means "at least one of A and B, i.e. possible just A, possibly just B, or possibly both."

The description and drawings are for illustration. The description is to aid the reader's understanding of the subject matter defined in the appended claims.

For convenience, and not to be regarded as limiting, reference numerals follow:

| tracking camera | 100 |
|---|---|
| TOF sensor | 110 |
| laser | 112 |
| beam splitter | 113 |
| data | 115 |
| camera sensor | 119 |
| mirror assembly | 130 |
| incident light | 141 |
| scattered light | 142 |
| another portion of light | 143 |
| controller | 150 |
| object of interest | 190 |
| camera data | 115a |
| TOF data | 115b |
| lens assembly | 120A, 120B |
| second position | 190b |
| tracking camera | 200 |
| TOF sensor | 210 |
| laser | 212 |
| beam splitter | 213a, 213b |
| data | 215 |
| camera sensor | 219 |
| mirror assembly | 230 |
| incident light | 241 |
| scattered light | 242 |
| controller | 250 |

-continued

| | |
|---|---|
| object of interest | 290 |
| camera data | 215a |
| TOF data | 215b |
| lens assembly | 220 |
| second position | 290b |
| optical axis | 201 |
| target direction | 201b |
| optical filter | 211 |
| bearing array | 300 |
| tracking camera | 400 |
| sensor(s) | 410 |
| data | 415 |
| mirror assembly | 430 |
| orientation feedback system | 439 |
| mirror assembly status | 435 |
| adjustment signal | 460 |
| controller | 450 |
| hybrid sensor | 500 |
| TOF pixels | 510 |
| camera sensor pixels | 520 |
| camera sensor | 530 |
| TOF sensor | 540 |
| tracking camera | 600 |
| sensor(s0 | 610 |
| laser | 612 |
| beam splitter | 613 |
| data | 615 |
| mirror assembly | 630 |
| incident light | 641 |
| scattered light | 642 |
| controller | 650 |
| object of interest | 690 |
| lens assembly | 620 |
| second position | 690b |
| optical axis | 601 |
| target direction | 601b |

The invention claimed is:

1. A tracking camera comprising:
a mirror assembly;
a hybrid sensor that includes a camera sensor and a Time of Flight (TOF) sensor, the hybrid sensor including pixels configured to determine the time of flight and the camera sensor includes an event camera; and
a control circuitry
configured to:
receive event data from the camera sensor and time of flight data from the TOF sensor,
estimate a bearing array corresponding to a tracked object based on the event data and the time of flight data, and
adjust the mirror assembly based on the bearing array.

2. The tracking camera of claim 1, further comprising:
a lens assembly for collecting light for the TOF sensor and the camera sensor.

3. The tracking camera of claim 2, wherein:
the lens assembly includes a first subassembly for collecting light for the camera sensor and a second subassembly for collecting light for the TOF sensor.

4. The tracking camera of claim 1, wherein
the camera sensor further includes a frame camera, and the camera sensor data further includes image data.

5. The tracking camera of claim 1, wherein
the mirror assembly comprises an actuatable mirror configured for adjustment based on an adjustment signal from the control circuitry.

6. The tracking camera of claim 5, wherein
the actuatable mirror of the mirror assembly is a galvanometer mirror, a microelectromechanical mirror, or a piezoelectric mirror.

7. The tracking camera of claim 5, wherein
the control circuitry is configured to:
determine the adjustment signal based on the data, and
transmit the adjustment signal to the mirror assembly for adjusting the mirror assembly.

8. The tracking camera of claim 1, further comprising
an orientation feedback system communicatively coupled to the control circuitry for communicating a mirror assembly status.

9. The tracking camera of claim 1, wherein
the control circuitry is configured to:
transmit the adjustment signal such that an optical axis of the tracking camera which extends out of the tracking camera is moved to a target direction based on the bearing array.

10. The tracking camera of claim 1, further comprising:
a beam splitter configured to split light from a field of view to each of the camera sensor and the TOF sensor.

11. The tracking camera of claim 1, further comprising:
a laser for irradiating an object of interest and for providing a TOF signal for the TOF sensor.

12. The tracking camera of claim 11, further comprising:
a beam splitter intersecting an optical axis of the tracking camera and configured to direct light from the laser out of the tracking camera.

13. A method of operating a tracking camera, comprising:
receiving data from a hybrid sensor that includes a Time of Flight (TOF) sensor and a camera sensor, the hybrid sensor including pixels configured to determine the time of flight and the camera sensor data includes event data;
estimating a bearing array corresponding to a tracked object based on the event data and time of flight data from the TOF sensor,
determining an adjustment signal based on the bearing array;
transmitting the adjustment signal to a mirror assembly; and
adjusting the mirror assembly according to the adjustment signal.

14. The method of operating a tracking camera of claim 13, further comprising:
forming an image of the tracked object on the camera sensor.

15. The method of operating a tracking camera of claim 13, further comprising:
accumulating the data for a time interval;
determining a common time within the time interval; wherein
the bearing array includes an element at the common time based on the accumulated data.

16. A non-transitory computer-readable storage medium storing a program code that, when executed by a processor, causes the processor to execute a method of operating a tracking camera, comprising:
receiving data from a hybrid sensor that includes a Time of Flight (TOF) sensor and a camera sensor, wherein the hybrid sensor includes pixels configured to determine the time of flight and camera sensor data includes event data;
estimating a bearing array corresponding to a tracked object based on the event data and time of flight data from the TOF sensor, determining an adjustment signal based on the bearing array;

transmitting the adjustment signal to a mirror assembly; and adjusting the mirror assembly according to the adjustment signal.

17. The non-transitory computer-readable storage medium of claim 16, wherein the processor is caused to:

receive an image of a tracked object on the camera sensor, estimating a bearing array based on the data, the bearing array corresponding to the tracked object; and determine the adjustment signal is based on the bearing array.

18. The non-transitory computer-readable storage medium of claim 17, wherein the processor is caused to:

accumulate the data for a time interval; and determine a common time within the time interval, wherein the bearing array includes an element at the common time based on the accumulated data.

\* \* \* \* \*